(12) United States Patent
Shintani

(10) Patent No.: US 8,031,412 B2
(45) Date of Patent: Oct. 4, 2011

(54) OPTICAL PART, LENS BARREL, AND CAMERA

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 584 days.

(21) Appl. No.: 12/020,207

(22) Filed: Jan. 25, 2008

(65) Prior Publication Data

US 2008/0181601 A1    Jul. 31, 2008

(30) Foreign Application Priority Data

Jan. 30, 2007    (JP) ................... 2007-019051

(51) Int. Cl.
G02B 9/00    (2006.01)
(52) U.S. Cl. ........................ 359/738; 359/740
(58) Field of Classification Search .......... 359/738–740
See application file for complete search history.

(56) References Cited

U.S. PATENT DOCUMENTS

| | | | |
|---|---|---|---|
| 4,886,342 A | 12/1989 | Kudo et al. | |
| 5,276,552 A | 1/1994 | Kohmoto et al. | |
| 5,703,724 A * | 12/1997 | Miyano | 359/660 |
| 6,239,922 B1 * | 5/2001 | Nakamura | 359/739 |
| 6,333,824 B1 | 12/2001 | Morooka | |
| 6,529,689 B1 | 3/2003 | Oshima | |
| 6,898,026 B2 * | 5/2005 | Jewers et al. | 359/738 |
| 7,035,016 B2 * | 4/2006 | Nishimura et al. | 359/661 |
| 2006/0018041 A1 * | 1/2006 | Hirata | 359/738 |
| 2007/0133106 A1 * | 6/2007 | Park | 359/738 |

FOREIGN PATENT DOCUMENTS

| | | |
|---|---|---|
| JP | 1-128328 | 9/1989 |
| JP | 01-128328 U | 9/1989 |
| JP | 4-109734 | 9/1992 |
| JP | 04-109734 U | 9/1992 |
| JP | 09-113783 | 5/1997 |
| JP | 2001-319350 | 11/2001 |
| JP | 2002-82370 | 3/2002 |
| JP | 2002-318303 | 10/2002 |
| JP | 2003-57721 | 2/2003 |
| JP | 2004-163751 | 6/2004 |
| JP | 2005-25074 | 1/2005 |
| JP | 2005-084273 | 3/2005 |
| JP | 2005-252908 | 9/2005 |
| JP | 2006-79073 | 3/2006 |
| JP | 2006-091164 | 4/2006 |

OTHER PUBLICATIONS

Japanese Office Action issued in Japanese Patent Application No. JP 2007-019051 dated Jul. 12, 2011.

* cited by examiner

*Primary Examiner* — Scott J Sugarman
(74) *Attorney, Agent, or Firm* — McDermott Will & Emery LLP

(57) ABSTRACT

An imaging optical system O supported by a lens barrel 3 includes a second lens group G2. The second lens group G2 includes a fourth lens 54 and a black light shielding portion 54*d* formed by printing. The light shielding portion 54*d* is a film-shaped portion formed on the surface of the fourth lens 54, and blocks harmful light in the imaging optical system O. The light shielding portion 54*d* includes a synthetic resin. The light shielding portion 54*d* is disposed in a non-effective optical area of the fourth lens 54. The effective light path of the imaging optical system O is determined by the light shielding portion 54*d*.

22 Claims, 7 Drawing Sheets

OPTICAL PART, LENS BARREL, AND CAMERA

CROSS-REFERENCE TO RELATED APPLICATIONS

This application claims priority to Japanese Patent Application No. JP2007-019051 filed on Jan. 30, 2007. The entire disclosures of Japanese Patent Application No. JP2007-019051 is hereby incorporated herein by reference.

BACKGROUND OF THE INVENTION

1. Field of the Invention

The present invention relates to an optical part, a lens barrel, and a camera, and more particularly relates to an optical part, lens barrel, and camera having a light shielding portion for blocking out harmful light.

2. Description of the Related Art

Ghost, flare, and other such problems that adversely affect the formation of an image sometimes occur in cameras and other such optical devices. When strong light is incident on an imaging optical system, part of the incident light is reflected by the lens surface in the imaging optical system, and this reflected light (harmful light) forms a false image, and this is what leads to ghost and flare.

Examples of how the generation of such harmful light can be suppressed include a method in which a thin, annular light shielding sheet is provided to the non-effective optical area of a lens, and a method in which a light shielding treatment is performed on the non-effective optical area of a lens.

The light shielding treatment of a lens is generally accomplished by inking, printing, or the like. Inking is a method in which the surface of a lens is coated with ink with a brush or the like. Examples of printing methods include screen printing and pad printing. These printing methods are disclosed, for example, in Japanese Laid-Open Utility Model Applications H4-109734 and H1-128328 and Japanese Laid-Open Patent Applications 2003-57721 and 2002-82370.

Optical devices need to have an overall compact size to make them more portable. More specifically, there is a need for a reduction in size of the lens barrel, which is considered to be a major factor in obtaining a smaller overall size.

As the size of a lens barrel is reduced, it becomes necessary to reduce the diameter of the lenses included in the imaging optical system. In this case, the amount of light passing through the lenses remains the same even though the lens barrel is made smaller. Consequently, when the diameter of a lens is decreased, illumination intensity (the amount of light per unit of surface area) on the lens increases. When a light shielding sheet is used, however, the distance between lenses cannot be shortened, and furthermore space must be provided to fix the light shielding sheet, which impedes efforts at reducing the size of the lens barrel.

Meanwhile, when harmful light is blocked not just by a light shielding sheet, but also by inking, there may be cases when the harmful light cannot be effectively blocked. The reason for this is that with inking, there tends to be variance in the coating film thickness, and the light shielding film is very thin, and that the original purpose of this ink is to reduce scattered reflection at the edges of the lens (the outer peripheral part of the lens), and the ink does not have high light shielding performance. Therefore, even though a reduction in lens barrel size may be achieved, there are cases when harmful light cannot be blocked with inking alone, and the optical performance of the optical system deteriorates.

Thus, there has been a need with conventional optical parts both to enhance optical performance and to reduce size.

SUMMARY OF THE INVENTION

It is an object of the present invention to provide an optical part, a lens barrel, and a camera with which higher optical performance and a smaller size can both be achieved.

The optical part according to a first aspect of the present invention is an optical part included in an imaging optical system, including a first lens element and a light shielding portion. The light shielding portion is a film-shaped portion formed on the surface of the first lens element, and blocks harmful light in the imaging optical system. The light shielding portion includes a synthetic resin. The light shielding portion is disposed in a non-effective optical area of the first lens element. The effective light path of the imaging optical system is determined by the light shielding portion.

Examples of the synthetic resin here include thermosetting resins and thermoplastic resins. A synthetic resin is included in the light shielding portion. This means that the light shielding portion is composed of not just ink used for inking, but also a printing ink. Inking is performed with a brush or the like. Printing, on the other hand, can entail screen printing, pad printing, or the like.

In general, a light shielding portion formed by printing can be easily made thicker and more uniformly than a light shielding portion formed by inking. Therefore, even if the illumination intensity of the light incident on the first lens element increases, harmful light can still be effectively blocked by the light shielding portion, and optical performance can be improved.

Also, since harmful light can be effectively blocked by the light shielding portion, there is no need to provide a light shielding sheet. In addition, a light shielding portion formed by printing has less thickness variance than a light shielding portion formed by inking. Therefore, the lenses can be positioned by bringing the first lens element into contact with another lens via the light shielding portion, without providing a light shielding sheet. This allows deterioration of optical performance to be prevented while the imaging optical system can be more compact.

Furthermore, with this optical part, the effective light path of the imaging optical system is determined by the light shielding portion. A light shielding portion formed by printing has higher precision of a coating area than a light shielding portion formed by inking. Therefore, the light shielding portion can be disposed closer to the effective light path, and a wider area can be ensured for the light shielding portion. This allows more harmful light to be blocked than in the past, and affords better optical performance.

Because of the above, with this optical part makes it possible both to enhance optical performance and to reduce size.

The term "effective optical area" here means the area used to form an optical image of a subject, an example of which is a lens face. The term "non-effective optical area" means an area that is outside the effective optical area, and an area not used to form an optical image of a subject, an example of which is the surface formed around the outer periphery of a lens, or an extension of a lens face for ensuring lens face precision. The term "effective light path" refers to the area through which passes the light flux that forms an optical image of a subject in the imaging optical system O.

The optical part according to a second aspect of the present invention is the optical part of the first aspect, further including a second lens disposed aligned with the first lens element along the optical axis of the first lens element. The second lens comes into contact with the first lens element indirectly via the light shielding portion along the optical axis.

This allows the imaging optical system to be more compact.

The optical part according to a third aspect of the present invention is the optical part of the first or second aspect, wherein the first lens element has an annular contact face that is disposed in the non-effective optical area and perpendicular to the optical axis. A portion of the optical part is disposed on the contact face.

The optical part according to the fourth aspect of the present invention is the optical part of any one of the first to third aspects, wherein the optical part includes a thermosetting resin that is one of the synthetic resins.

Examples of the thermosetting resin here include polyurethane resins (PUR) and epoxy resins (EP).

The optical part according to the fifth aspect of the present invention is the optical part of any one of the first to fourth aspects, wherein an antireflective treatment is performed over the area of the first lens element where the light shielding portion is formed.

This prevents the harmful light from being reflected at the interface between the light shielding portion and the first lens element, and further improves optical performance.

The lens barrel according to the sixth aspect of the present invention is a lens barrel for supporting an imaging optical system, including the optical part according to any one of the first to fifth aspects of the present invention and included in the imaging optical system, and a support member supporting the optical part.

With this lens barrel, it is possible to achieve both better optical performance and a more compact size.

The camera according to the seventh aspect of the present invention includes the lens barrel according to the sixth aspect, an imaging optical system supported by the lens barrel, an imaging unit for capturing an optical image of a subject formed by the imaging optical system, and an outer case supporting the lens barrel.

With this camera, it is possible both to enhance optical performance and to reduce size.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The lens barrel and camera according to the present invention will now be described with reference to the drawings.

1. Overview of Digital Camera

Figure 1:
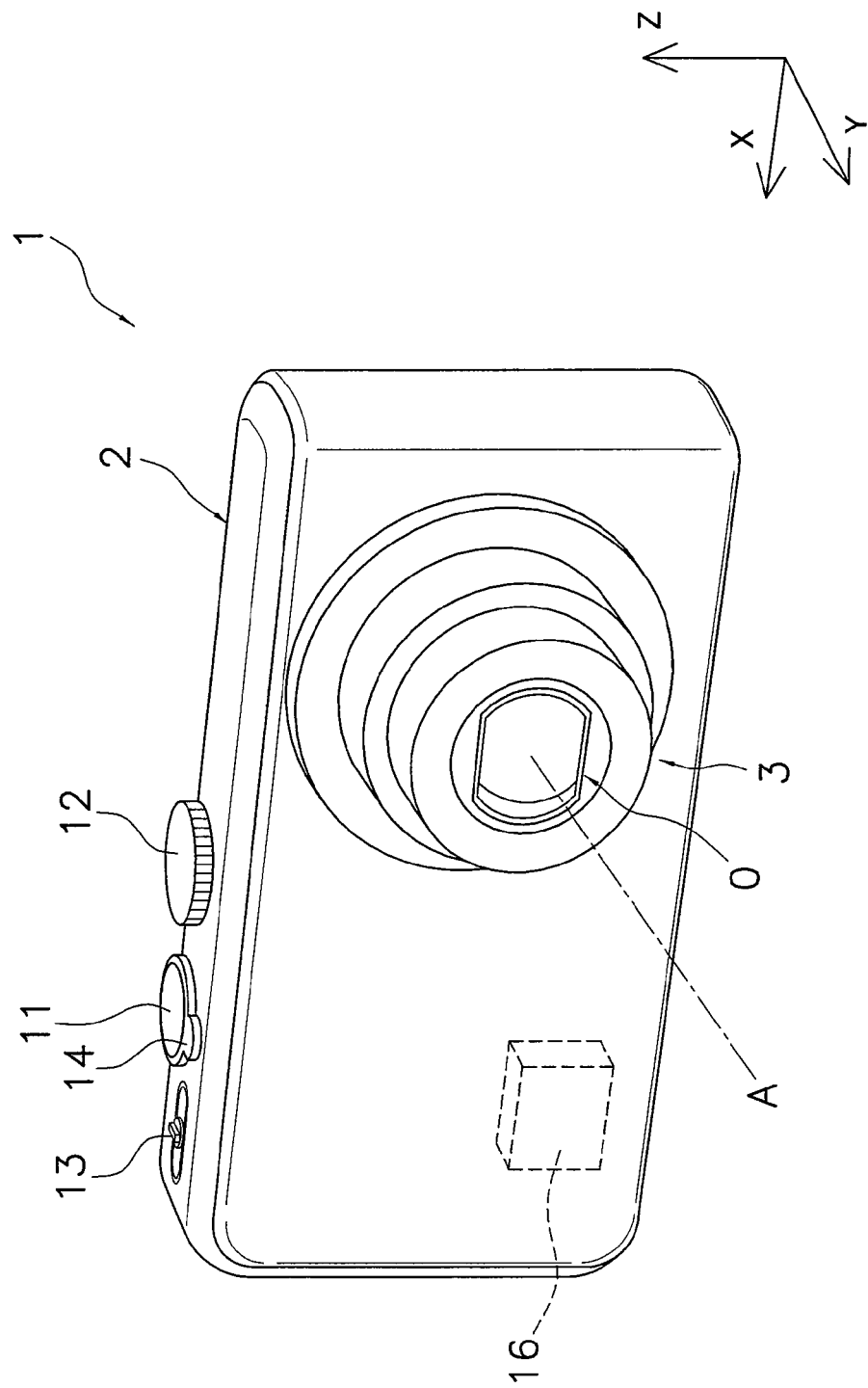
FIG. 1 is a schematic perspective view of a digital camera.
Figure 2:
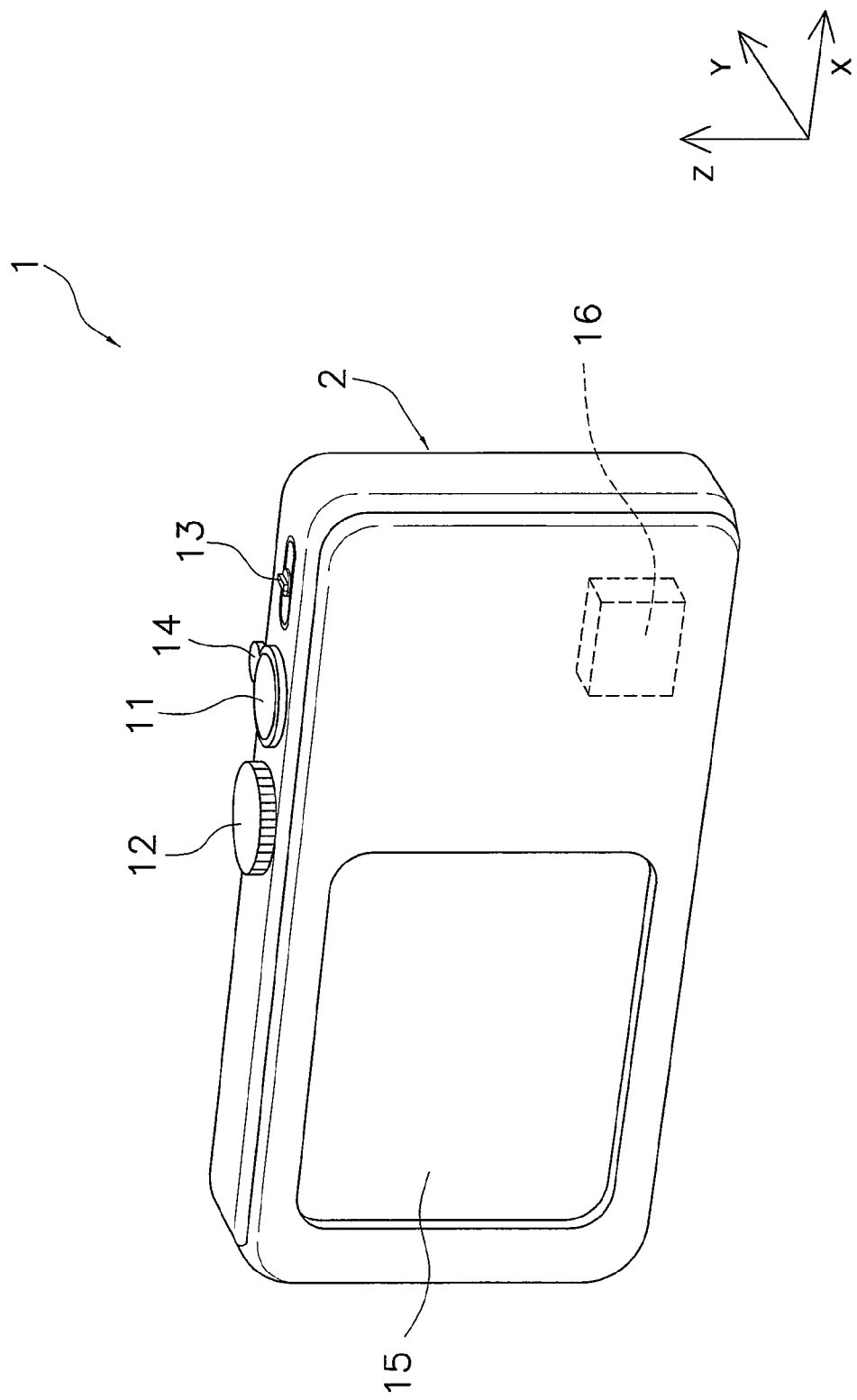
FIG. 2 is a schematic perspective view of a digital camera.

A digital camera 1 according to a preferred embodiment of the present invention will be described with reference to FIGS. 1 and 2. FIGS. 1 and 2 are schematic perspective views of the digital camera 1. FIG. 1 shows the situation when a lens barrel 3 is in an image capture state.

The digital camera 1 is a camera for acquiring an image of a subject. A multistage retractable lens barrel 3 is installed in the digital camera 1 in order to afford higher magnification and a more compact size.

In the following description, the six sides of the digital camera 1 are defined as follows.

The side that faces the subject when an image is captured with the digital camera 1 is called the front face, and the opposite side is called the rear face. When an image is captured such that the top and bottom of the subject in the vertical direction coincide with the short-side top and bottom of a rectangular image (generally with an aspect ratio (the ratio of the long side to the short side) of 3:2, 4:3, 16:9, etc.) captured by the digital camera 1, the side of the camera facing upward (vertically) is called the top face, and the opposite side is called the bottom face. Further, when an image is captured such that the top and bottom of the subject in the vertical direction coincide with the short-side top and bottom of a rectangular image captured by the digital camera 1, the side of the camera that is to the left when viewed from the subject side is called the left face, and the opposite side is called the right face. The above definitions are not intended to limit the orientation in which the digital camera 1 is used.

According to the above definitions, FIG. 1 is a perspective view of the front, top, and left faces.

In addition to the six sides of the digital camera 1, the six sides of the various constituent members disposed in the digital camera 1 are similarly defined. That is, the above definitions apply to the six sides of the various constituent members when they have been disposed in the digital camera 1.

Also, as shown in FIG. 1, there is defined a three-dimensional coordinate system (right-hand system) having a Y axis that is parallel to the optical axis A of an imaging optical system O (discussed below). With this definition, the direction from the rear face side toward the front face side along the optical axis A is the Y axis positive direction, the direction from the right face side toward the left face side perpendicular to the optical axis A is the X axis positive direction, and the direction from the bottom face side toward the top face side perpendicular to the X and Y axes is the Z axis positive direction.

This XYZ coordinate system will be referred to in the following description of the drawings. That is, the X axis positive direction, the Y axis positive direction, and the Z axis positive direction in the drawings indicate the same respective directions.

2. Overall Structure of a Digital Camera

As shown in FIGS. 1 and 2, the digital camera 1 mainly includes an outer case 2 that holds the various units, an imaging optical system O that forms an optical image of the subject, and a lens barrel 3 that movably supports the imaging optical system O.

The imaging optical system O is made up of a plurality of lens groups, and these lens groups are disposed in a state of being aligned in the Y axis direction. The lens barrel 3 has a multistage retractable configuration, and is supported by the outer case 2. The plurality of lens groups are supported by the lens barrel 3 to be relatively movable in the Y axis direction. The configuration of the lens barrel 3 will be described in detail below.

A CCD unit 21 serving as an imaging unit that subjects optical images to photoelectric conversion, and an image storing unit 16 that stores the images acquired by the CCD unit 21 are built into the outer case 2. A liquid crystal monitor 15 for displaying the images acquired by the CCD unit 21 is provided to the rear face of the outer case 2.

A shutter release button 11, a control dial 12, a power switch 13, and a zoom adjustment lever 14 are provided to the top face of the outer case 2 so that the user can capture images and perform other such operations. The shutter release button 11 is a button for inputting the exposure timing. The control dial 12 is a dial for making various settings related to image capture. The power switch 13 is used to switch the digital camera 1 on and off. The zoom adjustment lever 14 is used to adjust the zoom magnification, and can rotate over a specific angle range around the shutter release button 11.

FIGS. 1 and 2 show only the main configuration of the digital camera 1, and therefore components other than those discussed above may be provided to the digital camera 1.

3. Configuration of Lens Barrel

Figure 3:
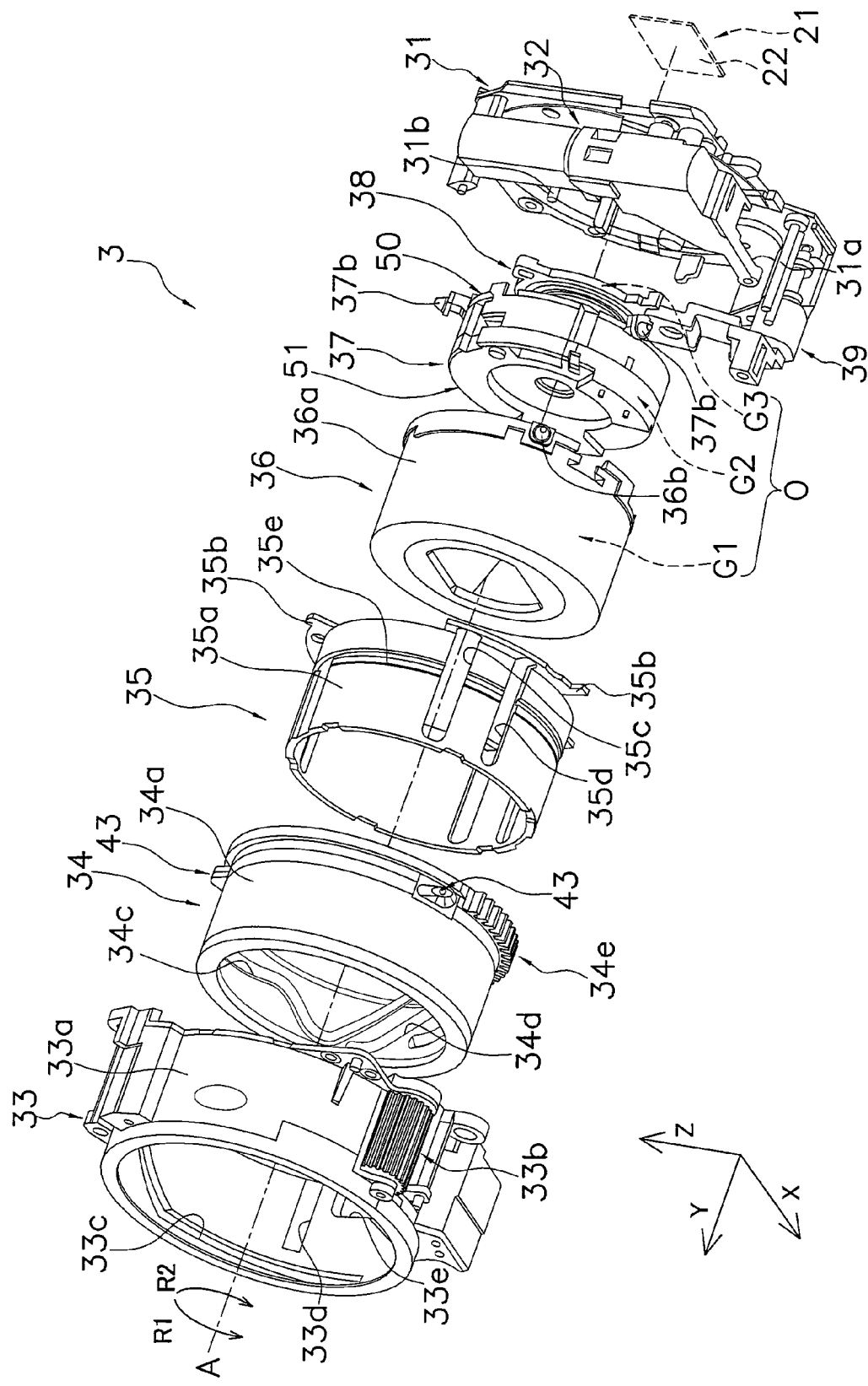
FIG. 3 is an exploded perspective view of a lens barrel.
Figure 4:
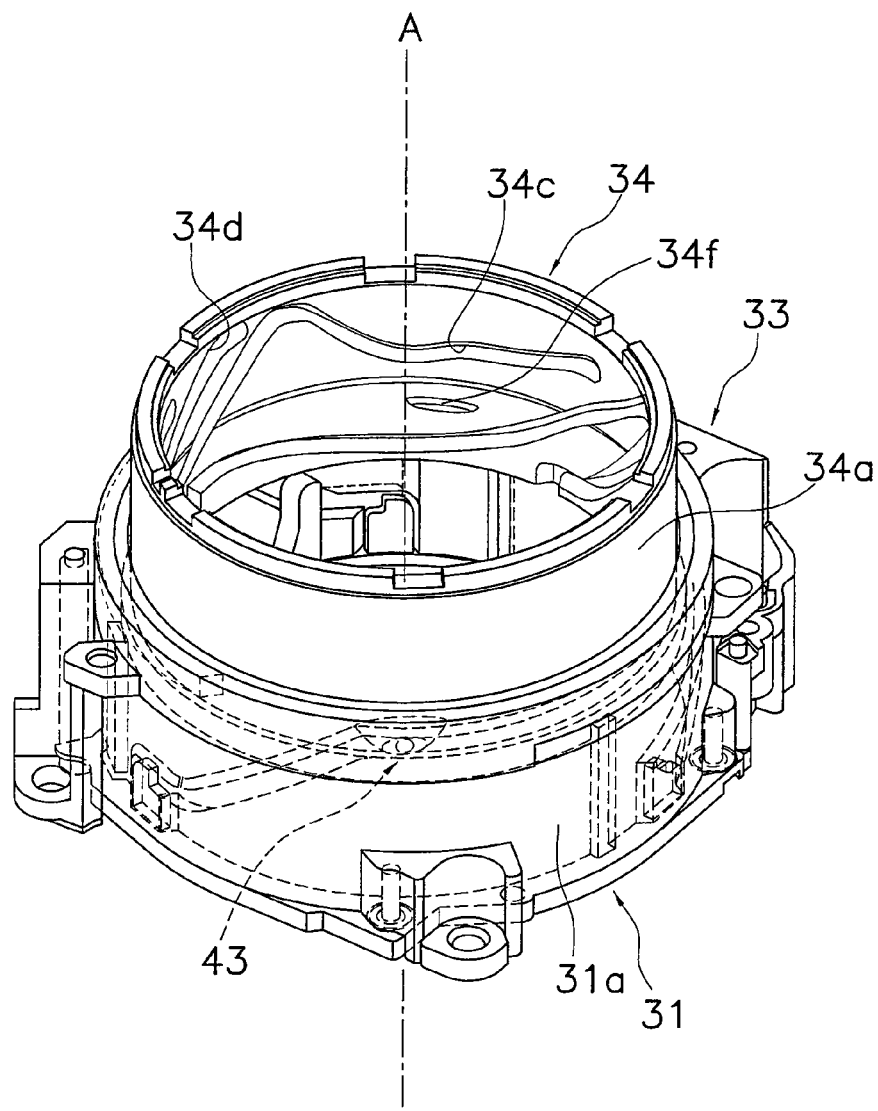
FIG. 4 is a schematic perspective view of a drive frame and a stationary frame.

The overall configuration of the lens barrel 3 will be described with reference to FIGS. 3 and 4. FIG. 3 is an exploded perspective view of the lens barrel 3, and FIG. 4 is a schematic perspective view of a drive frame and a stationary frame.

As shown in FIG. 3, the lens barrel 3 mainly includes a base plate 31 fixed to the outer case 2, a zoom motor 32 fixed to the base plate 31 and serving as a drive source, a stationary frame 33 that holds various frame members between itself and the base plate 31, a drive frame 34 to which the drive force of the zoom motor 32 is inputted, and a straight-movement frame 35 that is supported by the stationary frame 33 to be relatively movable in the Y axis direction. A CCD sensor 22 of the CCD unit 21 is attached to the base plate 31. An example of the zoom motor 32 is a stepping motor.

The lens barrel 3 further includes a first lens frame 36 that supports a first lens group G1, a second lens frame 37 that supports a second lens group G2, and a third lens frame 38 that supports a third lens group G3. The first lens group G1 is, for example, a lens group having negative power overall, and takes in light from the subject. The second lens group G2 is, for example, a lens group having positive power overall. The third lens group G3 is, for example, a lens group having positive power for adjusting the focal point. The imaging optical system O is made up of the first lens group G1, the second lens group G2, and the third lens group G3.

3.1. Stationary Frame

The stationary frame 33 is a member for guiding the drive frame 34, and makes up a member on the stationary side of the lens barrel 3 along with the base plate 31. The stationary frame 33 is fixed by screws to the base plate 31. The stationary frame 33 mainly includes a stationary frame main body 33a that makes up the main part, and a drive gear 33b that is rotatably supported by the stationary frame main body 33a.

The stationary frame main body 33a is fixed to the base plate 31, and the drive frame 34 is disposed inside the inner periphery thereof. The drive gear 33b is a member for transmitting the drive force of the zoom motor 32 to the drive frame 34, and meshes with a gear (not shown) of the zoom motor 32. Three cam grooves 33c for guiding the drive frame 34, and three straight-movement grooves 33d for guiding the straight-movement frame 35 are formed on the inner peripheral part of the stationary frame main body 33a. The cam grooves 33c are spaced equally in the circumferential direction. The straight-movement grooves 33d extend in the Y axis direction, and are spaced equally in the circumferential direction.

3.2. Drive Frame

The drive frame 34 is a member for guiding the first lens frame 36 and the second lens frame 37, and is disposed inside the inner periphery of the stationary frame 33. The drive frame 34 mainly includes a substantially cylindrical drive frame main body 34a that is disposed inside the inner periphery of the stationary frame main body 33a.

Three cam pins 43 are provided as cam members on the outer peripheral part of the drive frame main body 34a, and three first cam grooves 34c and three second cam grooves 34d are formed on the inner peripheral part. The first cam grooves 34c are grooves for guiding the first lens frame 36. The second cam grooves 34d are grooves for guiding the second lens frame 37. The three cam pins 43 are spaced equally in the circumferential direction, and engage with the three cam grooves 33c of the stationary frame 33. That is, the drive frame 34 is supported by the stationary frame 33 via the cam pins 43.

A gear portion 34e is formed on the outer peripheral part of the drive frame main body 34a. The gear portion 34e meshes with the drive gear 33b of the stationary frame 33. As a result, the drive force of the zoom motor 32 is transmitted through the drive gear 33b to the drive frame 34.

The drive frame 34 is driven around the optical axis A (the R1 direction and the R2 direction) by the drive force of the zoom motor 32. When the camera 1 changes from their retracted state to their image capture state, the drive frame 34 is driven to the R1 side by the zoom motor 32. As a result, the cam pins 43 move along the cam grooves 33c of the stationary frame 33, and the drive frame 34 moves to the Y axis direction positive side relative to the stationary frame 33. When the camera 1 changes from their image capture state to their retracted state, the drive frame 34 is driven to the R2 side by the zoom motor 32. As a result, the drive frame 34 moves to the Y axis direction negative side relative to the stationary frame 33.

Thus, the drive frame 34 is movable in the Y axis direction while rotating relative to the stationary frame 33, according to the shape of the cam grooves 33c.

3.3. Straight-Movement Frame

The straight-movement frame 35 is a member for preventing the rotation of the first lens frame 36 relative to the stationary frame 33, and is disposed inside the inner periphery of the drive frame 34. The straight-movement frame 35 mainly includes a cylindrical straight-movement frame main body 35a and three straight-movement pins 35b formed on the outer peripheral part of the straight-movement frame main body 35a.

The straight-movement pins 35b are disposed on the Y axis direction negative side of the straight-movement frame main body 35a so as not to interfere with the drive frame 34, and engage with the straight-movement grooves 33d in the stationary frame 33. That is, the straight-movement frame 35 is supported by the stationary frame 33 to be relatively straight movable in the Y axis direction.

A bayonet groove 35e is formed on the outer peripheral part of the straight-movement frame main body 35a. A bayonet tab 34f (see FIG. 4) formed on the inner peripheral part of the drive frame 34 engages with the bayonet groove 35e. This allows the straight-movement frame 35 to rotate relative to the drive frame 34 and to move integrally in the Y axis direction.

Specifically, when the drive frame 34 rotates relative to the stationary frame 33, the straight-movement frame 35 moves along with the drive frame 34 in the Y axis direction without rotating relative to the stationary frame 33 (while rotating relative to the drive frame 34).

Three first guide grooves 35c and three second guide grooves 35d that extend in the Y axis direction are formed in the straight-movement frame main body 35a. The three first guide grooves 35c are spaced equally in the circumferential direction, and the three second guide grooves 35d are spaced equally in the circumferential direction. Cam pins 36b (discussed below) of the first lens frame 36 are inserted in the first guide grooves 35c. Cam pins 37b (discussed below) of the second lens frame 37 are inserted in the second guide grooves 35d. That is, the rotation of the first lens frame 36 and the second lens frame 37 relative to the stationary frame 33 is restricted by the straight-movement frame 35. Furthermore, movement of the first lens frame 36 and the second lens frame 37 in the Y axis direction is not restricted by the first guide grooves 35c and the second guide grooves 35d.

3.4. First Lens Frame

The first lens frame 36 is a member for supporting the first lens group G1 to be relatively movable in the Y axis direction, and is disposed inside the inner periphery of the straight-movement frame 35. The first lens frame 36 mainly includes a first lens frame main body 36a in the interior of which is held the first lens group G1, and the three cam pins 36b provided on the outer peripheral part of the first lens frame main body 36a. The cam pins 36b are passed through the first guide grooves 35c and engage with the first cam grooves 34c of the drive frame 34.

When the drive frame 34 rotates relative to the stationary frame 33, the cam pins 36b move along the first cam grooves 34c. The movement of the cam pins 36b in the rotary direction here is restricted by the first guide grooves 35c of the straight-movement frame 35. Therefore, the cam pins 36b move only in the Y axis direction along the first cam grooves 34c and the first guide grooves 35c. Thus, the first lens frame 36 is movable in the Y axis direction relative to the drive frame 34 according to the shape of the first cam grooves 34c, without rotating relative to the stationary frame 33.

3.5. Second Lens Frame

The second lens frame 37 is a member for supporting the second lens group G2 to be relatively movable in the Y axis direction, and is disposed inside the inner periphery of the straight-movement frame 35 and on the Y axis direction negative side of the first lens frame 36. The second lens frame 37 mainly includes a first frame 50 and second frame 59 in the interior of which is held the second lens group G2, and the three cam pins 37b provided on the outer peripheral part of the first frame 50. The cam pins 37b are passed through the second guide grooves 35d and engage with the second cam grooves 34d of the drive frame 34.

When the drive frame 34 rotates relative to the stationary frame 33, the cam pins 37b move along the second guide grooves 35d. The movement of the cam pins 37b here in the rotational direction is restricted by the second guide grooves 35d of the straight-movement frame 35. Therefore, just as with the first lens frame 36, the cam pins 37b move only in the Y axis direction along the second cam grooves 34d and the second guide grooves 35d.

Thus, the second lens frame 37 is movable in the Y axis direction relative to the drive frame 34 according to the shape of the second cam grooves 34d, without rotating relative to the stationary frame 33.

3.6. Third Lens Frame

The third lens frame 38 is a member for supporting the third lens group G3 to be relatively movable in the Y axis direction, and is supported by focus shafts 31a and 31b of the base plate 31 to be relatively movable in the Y axis direction. The third lens frame 38 is driven by a focus motor 39 fixed to the base plate 31. The focus motor 39 moves the third lens frame 38 in the Y axis direction relative to the base plate 31.

3.7. Summary

To summarize the above configuration, the first lens frame 36 and the second lens frame 37 can be moved in the direction along the optical axis A by the zoom motor 32 via the stationary frame 33, the drive frame 34, and the straight-movement frame 35. The third lens frame 38 can be moved in the direction along the optical axis A by the focus motor 39.

Therefore, this configuration results in a retractable lens barrel 3 that allows adjustment of the focus and the zoom magnification of the imaging optical system O.

4. Light Shielding Treatment

Figure 5:
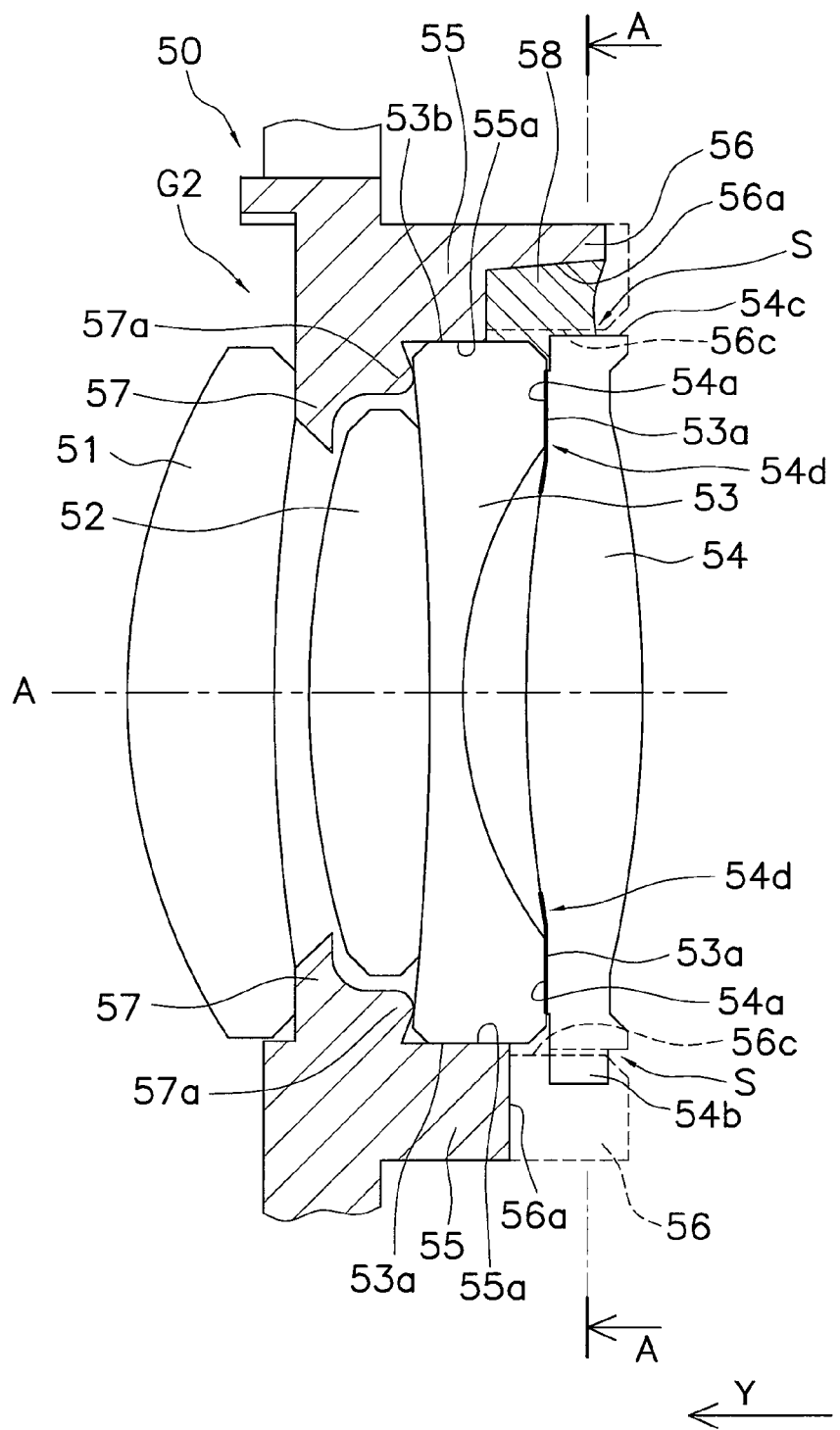
FIG. 5 is a schematic cross-sectional view of a second lens group and the surrounding area thereof.
Figure 6:
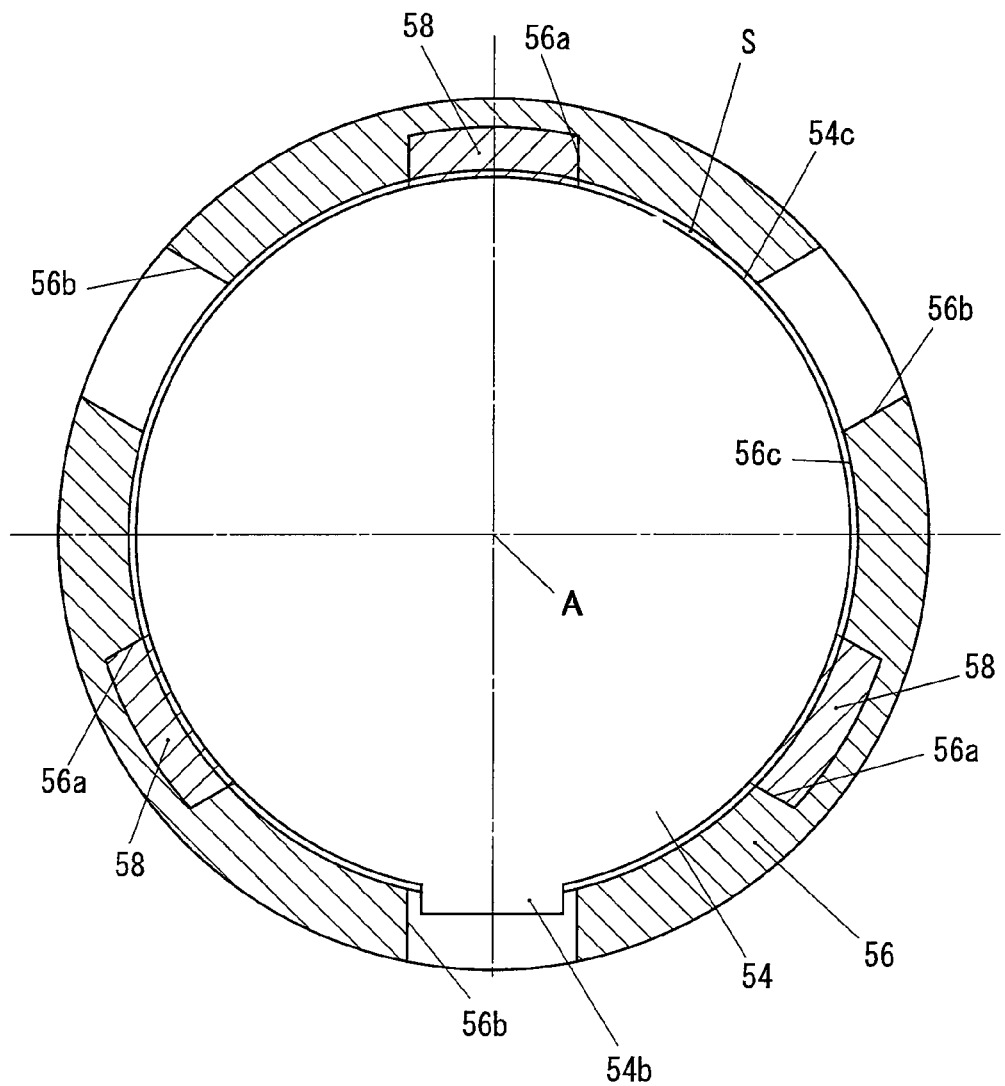
FIG. 6 is a schematic cross-sectional view along the A-A line in FIG. 5.
Figure 7B:
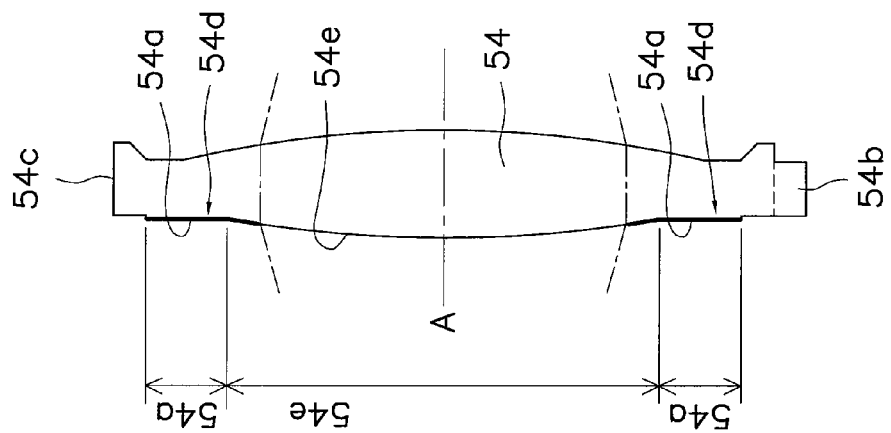
FIGS. 7A and 7B are detail views of a fourth lens.
Figure 7A:
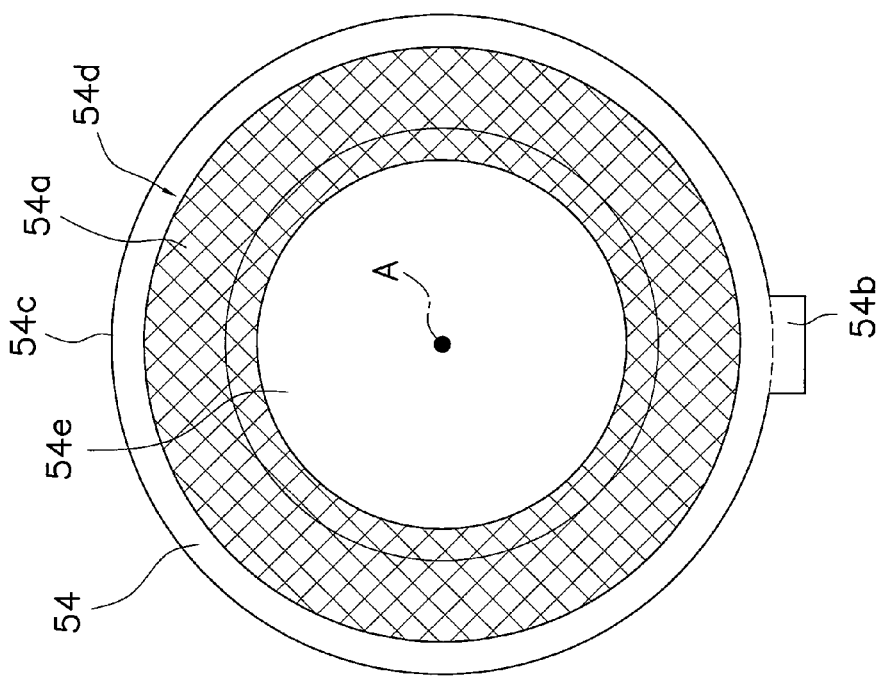

With this lens barrel 3, the lenses undergo a light shielding treatment to suppress the occurrence of ghost and flare. The second lens group G2 will be used as an example here to describe the light shielding treatment. FIG. 5 is a schematic cross-sectional view of the second lens group G2 and the surrounding area thereof, FIG. 6 is a schematic cross-sectional view along the A-A line in FIG. 5, and FIGS. 7A and 7B are detail views of a fourth lens.

4.1. Lens Support Structure

Before the light shielding treatment is described, we will describe the support structure of the second lens group G2. As shown in FIG. 5, the second lens group G2 includes a first lens 51, a second lens 52, a third lens 53 (serving as the second lens element), and a fourth lens 54 (serving as the first lens element).

The first lens 51 is a convex meniscus lens made of glass. The second lens 52 is a biconvex lens made of glass. The third lens 53 is a biconcave lens made of glass. The second lens 52 is joined to the lens face on the Y axis direction positive side of the third lens 53. The fourth lens 54 is a biconvex lens made of plastic. The outside diameter of the fourth lens 54 is larger than the outside diameter of the third lens 53. Since the fourth lens 54 is made of plastic, the fourth lens 54 is less rigid and has a larger coefficient of linear expansion than the third lens 53.

These lenses are fixed to various parts of the first frame 50 (serving as the support member). More specifically, as shown in FIGS. 5 and 6, the first frame 50 includes an annular first portion 55 that supports the third lens 53, a second portion 56 that supports the fourth lens 54 and is formed on the Y axis direction negative side of the first portion 55, and a third portion 57 that supports the first lens 51. The first lens 51 is fixed on the Y axis direction positive side of the third portion 57.

The first portion 55 is an annular portion that makes up the main part of the first frame 50, and the third lens 53 is fitted via a tiny gap or press-fitted into the inner peripheral side of the first portion 55. More specifically, in the case of press-fitting, the inside diameter of the first portion 55 is slightly smaller than the outside diameter of the third lens 53, and the first portion 55 presses radially inwardly the third lens 53. The inner peripheral face 55a of the first portion 55 comes into contact with the outer peripheral face 53b of the third lens 53. As a result, the third lens 53 is positioned in the radial direction relative to the first frame 50.

The annular third portion 57, which extends to the inside in the radial direction, is formed at the inner peripheral part on the Y axis direction positive side of the first portion 55. The third portion 57 has an annular contact part 57a that extends radially inwardly to the Y axis direction negative side. The contact part 57a comes into contact in the Y axis direction with the outer peripheral part of the third lens 53. As a result, the third lens 53 is positioned in the Y axis direction relative to the first frame 50, and the orientation (angle) of the third lens 53 relative to the optical axis A is stabilized.

The fourth lens 54 is disposed radially inside the inner periphery of the second portion 56. More specifically, a gap S is ensured in the radial direction between the inner peripheral face 56c of the second portion 56 and the outer peripheral face 54c of the fourth lens 54.

The fourth lens 54 is fixed by bonding to the second portion 56. More specifically, three bonding grooves 56a that are disposed at a constant pitch in the circumferential direction are formed in the second portion 56. At least two bonding grooves 56a may be formed in the second portion 56. Each of the bonding grooves 56a is filled with an adhesive agent 58, and the fourth lens 54 and the second portion 56 are bonded together by the adhesive agent 58. Specifically, the fourth lens 54 is fixed to the first frame 50 at three points by the adhesive agent 58. An example of the adhesive agent 58 is a UV curing adhesive agent that is cured by irradiation with ultraviolet rays.

The fourth lens 54 is in marginal contact with the third lens 53. More specifically, an annular contact face 53a that is perpendicular to the optical axis of the third lens 53 is formed on the Y axis direction negative side of the third lens 53. An annular contact face 54a that is perpendicular to the optical axis of the fourth lens 54 is formed on the Y axis direction positive side of the fourth lens 54. The contact faces 53a and 54a are disposed in an area that will not affect the optical performance of the second lens group G2 (non-effective optical area). The contact face 54a of the fourth lens 54 comes into contact with the contact face 53 a of the third lens 53. More precisely, the fourth lens 54 comes into contact with the third lens 53 indirectly via a light shielding portion 54d (discussed below). As a result, the fourth lens 54 is positioned in the Y axis direction relative to the third lens 53, and the orientation (angle) of the fourth lens 54 relative to the optical axis A is stabilized.

Furthermore, bonding grooves 56a extend to near the center in the Y axis direction of the third lens 53. Therefore, the outer peripheral part of the third lens 53 and the outer peripheral part of the fourth lens 54 are fixed to the second portion 56 by the adhesive agent 58. Also, the outer peripheral part of the fourth lens 54 is bonded to the outer peripheral part of the third lens 53 by the adhesive agent 58. This prevents the third lens 53 and the fourth lens 54 from shifting out of place relative to the first frame 50.

Also, the fourth lens 54 has a protrusion 54b that extends to the outside in the radial direction. The protrusion 54b may also be formed at a plurality of locations. Three cut-outs 56b are formed in the second portion 56. The cut-outs 56b are disposed in between the bonding grooves 56a in the circumferential direction (rotational direction). The protrusion 54b is inserted in a cut-out 56b via a gap. The protrusion 54b also encompasses one created for manufacturing purposes. A possible example of the protrusion 54b is a gate used during the molding of a plastic lens.

With this lens support structure, the inside diameter of the first portion 55 is different from the inside diameter of the second portion 56. More specifically, the inside diameter of the first portion 55 is smaller than the inside diameter of the second portion 56. Therefore, the inside diameter of the first portion 55 and the inside diameter of the second portion 56 can be adjusted separately.

Examples of methods for adjusting the dimensions include adjusting the metal mold when the first frame 50 is produced by injection molding, and adjustment by machining when the first frame 50 is produced by mechanical working. As a result, this lens support structure can accommodate cases when the outside diameter of the third lens 53 is different from the outside diameter of the fourth lens 54.

Also, with this lens support structure, in adjusting the lenses 53 and 54 to be coaxial, it is possible to adjust only the inside diameter of the portions corresponding to the lenses 53 and 54. That is, with this lens support structure the lenses can be precisely adjusted to be coaxial, and deterioration of optical performance can be prevented.

Because of the above, with this lens support structure, deterioration of optical performance can be prevented while design freedom can be increased.

4.2. Light Shielding Portion

A black light shielding portion 54d for blocking out harmful light is formed on the fourth lens 54. More specifically, as shown in FIGS. 5 and 7, the light shielding portion 54d is formed on the surface on the Y axial direction positive side of the fourth lens 54, and is disposed over the entire surface of the contact face 54a and on the outer peripheral part of a lens face 54e. The surface of the fourth lens 54, including the contact face 54a and the lens face 54e, may be subjected to an antireflective treatment such as an AR (antireflective) coating. The fourth lens 54 comes into contact with the third lens 53 indirectly via the light shielding portion 54d. It is also conceivable that the light shielding portion 54d would be sandwiched between the third lens 53 and the fourth lens 54. The orientation (angle) of the fourth lens 54 relative to the third lens 53 is determined by the contact face 53a, the contact face 54a, and the light shielding portion 54d.

The lens face 54e of the fourth lens 54 is the effective optical area, while the contact face 54a is the non-effective optical area. That is, the light shielding portion 54d is disposed in both the effective optical area and the non-effective optical area of the fourth lens 54. The effective light path of the imaging optical system O is determined by the light shielding portion 54d. More specifically, the outermost peripheral part of the light flux emitted from the third lens 53 is blocked by the inner peripheral part of the light shielding portion 54d.

The term "effective optical area" here means the area used to form an optical image of a subject, an example of which is the lens face 54e of the fourth lens 54. The term "non-effective optical area" means an area that is outside the effective optical area, and an area not used to form an optical image of a subject, an example of which is the contact face 54a of the fourth lens 54, or an extension of the lens face for ensuring lens face precision. The term "effective light path" refers to the area through which passes the light flux that forms an optical image of a subject in the imaging optical system O.

4.3. Printing

The light shielding portion 54d is formed by printing, rather than inking. More specifically, the light shielding portion 54d includes a synthetic resin. An example of the printing ink is a thermosetting resin belonging to the class of synthetic resins. More specifically, examples include two-component reaction-type inks including polyurethane resins (PUR), epoxy resins (EP), or the like.

For example, a two-component reaction-type urethane-based ink is made up of a main agent having a hydroxyl group and including a pigment, and a curing agent having an isocyanate group. The main agent and the curing agent are mixed so that the hydroxyl groups and isocyanate groups will react, producing a plurality of urethane bonds. As a result, a polyurethane is produced, a group of carbon black particles serving as a pigment are cured along with the polyurethane resin, and a black film is formed on the surface of the lens. Examples of the main component of a two-component reaction-type urethane-based ink include trimethylbenzene (mixture), ethylene glycol monoethyl ether acetate, cyclohexane, toluene, xylene, ethylbenzene, cumene, carbon black, and acrylic resin mixtures. Recent years have also seen the development of one-component reaction-type urethane-based inks, and it is possible that a one-component reaction-type urethane-based ink could be used as the printing ink.

Examples of printing methods include screen printing (in which a screen is used) and pad printing (in which a pad is used). With screen printing, the openings in the screen, which is woven from fibers of polyester or the like, are plugged up where printing is not to be performed. The screen is pressed against the lens and ink made up of a mixed liquid is supplied over the screen. A rubber squeegee is moved over the screen to force the ink through the openings of the screen that are not plugged, so that the ink coats the area to be printed of the lens. This allows the desired area of the lens to be coated with ink.

In general, a light shielding portion formed by printing can be easily made thicker than a light shielding portion formed by inking. This is because with a printing ink it is easier to adjust the mix ratio of the pigment and the organic solvent in which the pigment is dissolved. For instance, when compared as a single coat, the thickness of a light shielding portion formed by inking is approximately 5 μm, whereas the thickness of the light shielding portion 54d formed by printing is approximately 10 μm. Therefore, the light shielding portion 54d not only features a different type of light shielding material, but also provides higher optical performance than a light shielding portion formed by inking.

Also, an light shielding portion formed by printing has less thickness variance than a light shielding portion formed by inking. For example, a light shielding portion formed by inking in a single coat does not provided satisfactory optical performance, which means that multiple coats are required, and the variance in the film thickness is approximately ±5 μm, whereas a light shielding portion formed by printing has film thickness variance of only approximately ±2 μm. Accordingly, even when the light shielding portion 54d is provided to the contact portions of the third lens 53 and the fourth lens 54, it is possible to ensure precision in the orientation (angle) of the fourth lens 54 relative to the third lens 53.

Furthermore, a light shielding portion formed by printing has higher precision of the coating area than a light shielding portion formed by inking. For instance, with a light shielding portion formed by printing, the variance in its position in the radial direction of the lens is about +25 μm, and therefore the light shielding portion 54d can be accurately disposed around the effective light path of the imaging optical system O. Also, even when the effective light path of the imaging optical system O is determined by the light shielding portion 54d, variance in the effective light path can be suppressed and deterioration of optical performance can be minimized.

5. Operation of Digital Camera

The operation of the digital camera 1 will be described with reference to FIGS. 1 to 3.

5.1. When Power is Off

When the power switch 13 is in its off position, the lens barrel 3 is stopped in its retracted position (the state in which the lens barrel 3 is at its shortest in the Y axis direction), so that the lens barrel 3 will fit within the external dimensions of the outer case 2 in the Y axis direction.

5.2. When Power is On

When the power switch 13 is switched on, power is supplied to the various units, and the lens barrel 3 is driven from its retracted state to its image capture state. More specifically, the drive frame 34 is driven by the zoom motor 32 by a specific angle to the R1 side relative to the stationary frame 33. As a result, the drive frame 34 moves to the Y axis direction positive side relative to the stationary frame 33 while rotating relative to the stationary frame 33 according to the shape of the cam grooves 33c.

When the drive frame 34 rotates and moves straight relative to the stationary frame 33, the first lens frame 36 and the second lens frame 37 move along with the drive frame 34 to the Y axis direction positive side relative to the stationary frame 33. The first lens frame 36 and the second lens frame 37 do not rotate relative to the stationary frame 33 at this point.

The first lens frame 36 and the second lens frame 37 move along with the drive frame 34 to the Y axis direction positive side while moving in the Y axis direction relative to the drive frame 34 according to the shape of the first cam grooves 34c and the second cam grooves 34d. At this time the first lens frame 36 and the second lens frame 37 move relatively in the Y axis direction. Specifically, the first lens frame 36 and the second lens frame 37 move in the Y axis direction relative to the stationary frame 33 by an amount that is larger (or smaller) than the amount of movement of the drive frame 34 in the Y axis direction.

When the rotation of the drive frame 34 is stopped, movement of the first lens frame 36 and the second lens frame 37 in the Y axis direction also stops, and the lens barrel 3 is in its image capture state.

5.3. Zoom Operation During Image Capture

When the zoom adjustment lever 14 is operated to the telephoto side, the drive frame 34 is driven by the zoom motor 32 to the R1 side relative to the stationary frame 33, according to the rotational angle and operation duration of the zoom adjustment lever 14. As a result, the drive frame 34, the first lens frame 36, and the second lens frame 37 move together to the Y axis direction positive side relative to the stationary frame 33, and the zoom magnification of the imaging optical system O is increased.

When the zoom adjustment lever 14 is operated to the wide-angle side, the drive frame 34 is driven by the zoom motor 32 to the R2 side relative to the stationary frame 33, according to the rotational angle and operation duration of the zoom adjustment lever 14. As a result, the drive frame 34, the first lens frame 36, and the second lens frame 37 move together to the Y axis direction negative side relative to the stationary frame 33, and the zoom magnification of the imaging optical system O is decreased.

6. Characteristics

The digital camera 1 and the lens barrel 3 are characterized as follows.

6.1

With this lens barrel 3, the light shielding portion 54d is formed by printing. In general, a light shielding portion formed by printing not only has higher light shielding performance of the light shielding paint than a light shielding portion formed by inking, but can also be easily made thicker. Therefore, even if the illumination intensity of the light incident on the fourth lens 54 increases, harmful light can be effectively blocked out by the light shielding portion 54d, and optical performance can be improved.

Also, since harmful light can be effectively blocked by the light shielding portion, there is no need to provide a light shielding sheet. In addition, the light shielding portion 54d formed by printing has less thickness variance than a light shielding portion formed by inking. Therefore, the orientation (angle) of the fourth lens 54 relative to the third lens 53 can be adjusted by bringing the fourth lens 54 into contact with the third lens 53 via the light shielding portion 54d, without providing a light shielding sheet. This allows optical performance to be improved and the size of the imaging optical system O to be more compact.

Also, when a light shielding sheet is provided, it has to be spaced from the optical face of the lens. However, with this lens barrel 3, since the light shielding portion 54d is formed by printing, the light shielding portion can closely contact with the optical face of the fourth lens 54, which further enhances light shielding performance.

Furthermore, with this lens barrel 3, the light shielding portion 54d is disposed in the effective optical area of the fourth lens 54, and the effective light path of the imaging optical system O is determined by the light shielding portion 54d. The light shielding portion 54d formed by printing has higher precision of a coating area than a light shielding portion forming by inking, and therefore the light shielding portion 54d can be disposed closer to the effective light path, and a wider area can be ensured for the light shielding portion 54d. This allows more harmful light to be blocked than in the past, and to improve optical performance.

Because of the above, with this lens barrel 3, it is possible both to enhance optical performance and to reduce size.

6.2

With this lens barrel 3, since the effective light path of the imaging optical system O is determined by the light shielding portion 54d, a wider area can be ensured for the light shielding portion 54d. This allows more harmful light to be blocked, and further improves optical performance.

Also, the light shielding portion 54d formed by printing has higher precision of a coating area than a light shielding portion forming by inking, and therefore variance in the effective light path can be suppressed, and deterioration in optical performance can be minimized.

6.3

With this lens barrel 3, the light shielding portion 54d is formed by printing, and therefore high light shielding performance can be obtained with a variety of optical systems by selecting the printing ink as dictated by the material of the lenses.

6.4

With this lens barrel 3, an antireflective treatment is performed over the area where the light shielding portion 54d is formed. This prevents the harmful light from being reflected at the interface between the light shielding portion 54d and the fourth lens 54, and further improves optical performance.

6.5

As discussed above, the lens barrel 3 is installed in this digital camera 1. Therefore, it is possible both to enhance optical performance and to reduce size. That is, the digital camera 1 will have high image quality and be compact in size.

7. Other Embodiments

The lens barrel and camera according to the present invention are not limited to the embodiment given above, and various modifications and alterations are possible without departing from the gist of the present invention.

7.1

In the above embodiment, the light shielding portion 54d was provided to the fourth lens 54, but a light shielding portion may be provided to the third lens 53 instead. Here again, the same effect as in the above embodiment will be obtained.

7.2

Conceivable devices in which the above-mentioned lens barrel 3 is installed include digital cameras that allow moving or still pictures to be captured, film cameras that make use of silver halide film, and so forth. In any case, the effect will be the same as that in the embodiments given above.

GENERAL INTERPRETATION OF TERMS

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An optical part included in an imaging optical system, comprising:
   a first lens element having a flat surface and a curved surface; and
   a light shielding portion that is a film-shaped portion formed on the flat surface of the first lens element, for blocking harmful light in the imaging optical system,
   wherein the light shielding portion is formed by a thin film, and is made from a polyurethane resin,
   the light shielding portion is disposed in a non-effective optical area of the first lens element,
   a part of the light shielding portion is formed on the curved surface, and
   the effective light path of the imaging optical system is determined by the light shielding portion.

2. The optical part according to claim 1,
   further comprising a second lens disposed aligned with the first lens element along the optical axis of the first lens element
   wherein the second lens comes into contact with the first lens element indirectly via the light shielding portion along the optical axis.

3. The optical part according to claim 2,
   wherein the first lens element has an annular contact face that is disposed in the non-effective optical area and perpendicular to the optical axis, and
   a portion of the optical part is disposed on the contact face.

4. The optical part according to claim 3, wherein the optical part includes a thermosetting resin that is one of the synthetic resins.

5. The optical part according to claim 4, wherein an antireflective treatment is performed over the area of the first lens element where the light shielding portion is formed.

6. A lens barrel for supporting an imaging optical system, comprising:
the optical part according to claim 5 and included in the imaging optical system; and
a support member supporting the optical part.

7. A camera comprising:
the lens barrel according to claim 6;
an imaging optical system supported by the lens barrel;
an imaging unit for capturing an optical image of a subject formed by the imaging optical system; and
an outer case supporting the lens barrel.

8. The optical part according to claim 1,
wherein the first lens element has an annular contact face that is disposed in the non-effective optical area and perpendicular to the optical axis, and
a portion of the optical part is disposed on the contact face.

9. The optical part according to claim 8, wherein the optical part includes a thermosetting resin that is one of the synthetic resins.

10. The optical part according to claim 9, wherein an antireflective treatment is performed over the area of the first lens element where the light shielding portion is formed.

11. The optical part according to claim 1, wherein the optical part includes a thermosetting resin that is one of the synthetic resins.

12. The optical part according to claim 11, wherein an antireflective treatment is performed over the area of the first lens element where the light shielding portion is formed.

13. The optical part according to claim 2, wherein the optical part includes a thermosetting resin that is one of the synthetic resins.

14. The optical part according to claim 13, wherein an antireflective treatment is performed over the area of the first lens element where the light shielding portion is formed.

15. The optical part according to claim 1, wherein an antireflective treatment is performed over the area of the first lens element where the light shielding portion is formed.

16. The optical part according to claim 2, wherein an antireflective treatment is performed over the area of the first lens element where the light shielding portion is formed.

17. The optical part according to claim 3, wherein an antireflective treatment is performed over the area of the first lens element where the light shielding portion is formed.

18. The optical part according to claim 8, wherein an antireflective treatment is performed over the area of the first lens element where the light shielding portion is formed.

19. A lens barrel for supporting an imaging optical system, comprising:
the lens support structure according to claim 4 and included in the imaging optical system; and
a support frame supporting the optical part.

20. A camera, comprising:
the lens barrel according to claim 19;
an imaging optical system supported by the lens barrel;
an imaging unit for capturing an optical image of a subject formed by the imaging optical system; and
an outer case supporting the lens barrel.

21. The optical part according to claim 1, wherein the light shielding portion is formed by printing.

22. The optical part according to claim 1, wherein the thickness of the light shielding portion is approximately 10 μm.

* * * * *